(12) United States Patent
Needham et al.

(10) Patent No.: US 7,392,432 B2
(45) Date of Patent: Jun. 24, 2008

(54) SYNCHRONIZING CROSS CHECKED PROCESSORS DURING INITIALIZATION BY MISCOMPARE

(75) Inventors: Thomas D. Needham, Poughkeepsie, NY (US); Bryan K. Tanoue, Poughkeepsie, NY (US); Jeffrey M. Turner, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 10/960,655

(22) Filed: Oct. 7, 2004

(65) Prior Publication Data

US 2006/0101306 A1    May 11, 2006

(51) Int. Cl.
*G06F 11/00* (2006.01)
(52) U.S. Cl. .............................. 714/36; 714/11; 714/23
(58) Field of Classification Search .................. None
See application file for complete search history.

(56) References Cited

U.S. PATENT DOCUMENTS

| | | | |
|---|---|---|---|
| 4,792,955 A * | 12/1988 | Johnson et al. | 714/10 |
| 5,384,906 A | 1/1995 | Horst | 395/550 |
| 5,428,768 A | 6/1995 | Sugahara | 395/575 |
| 5,537,655 A * | 7/1996 | Truong | 714/12 |
| 5,758,058 A * | 5/1998 | Milburn | 714/11 |
| 6,393,582 B1 * | 5/2002 | Klecka et al. | 714/11 |
| 6,711,702 B1 * | 3/2004 | Oberhauser | 714/47 |
| 2002/0144177 A1 | 10/2002 | Kondo et al. | 714/13 |
| 2002/0184576 A1 * | 12/2002 | Arndt et al. | 714/48 |
| 2004/0068727 A1 | 4/2004 | Zilles et al. | 718/100 |
| 2004/0078650 A1 * | 4/2004 | Safford et al. | 714/11 |
| 2004/0117571 A1 | 6/2004 | Chang et al. | 711/162 |

* cited by examiner

*Primary Examiner*—Gabriel Chu
(74) *Attorney, Agent, or Firm*—Arthur Ortega

(57) ABSTRACT

A few inexpensive hardware facilities are incorporated in a tightly synchronized cross checked design. These facilities allow initialization software to quickly bring the two processors to the same state by rapid, repeated resets and execution of the initialization software. The resets are done in a way as to be transparent to the rest of the system and to the end user.

3 Claims, 2 Drawing Sheets

SYNCHRONIZING CROSS CHECKED PROCESSORS DURING INITIALIZATION BY MISCOMPARE

BACKGROUND OF THE INVENTION

1. Technical Field of the Invention

The present invention relates generally to the hardware design of computer systems, ASICs, systems-on-a-chip, etc., utilizing multiple cores or multiple processors. In particular, this invention relates to computer system hardware and methods of initializing computer hardware, and to a method and apparatus for initializing multiple processors to an identical state, such that they will operate in an identical manner.

2. Description of the Prior Art

Some information processing systems are used for tasks wherein the costs of the consequences of undetected failure are high, such as in financial transaction processing, aviation, and medical equipment operation. The failure may take many forms, but ultimately results in incorrect output. Modern microprocessors or microcontrollers, which are implemented in these information processing systems, have many attractive features, but, unfortunately, error detection is not usually one of them. In a system that requires high integrity, two or more microprocessors or processor cores may be used to simultaneously execute software programs, and hardware may be designed to check their outputs to assure that they agree. This is typically referred to as a "cross checked" system design. When a miscompare of the outputs occurs, that is, the outputs do not agree, either an error interrupt is presented to the processor(s) and/or some actions are taken in the rest of the system to prevent data contamination.

One method of designing a cross checked system is to loosely synchronize the two processors, meaning that they are not doing the exact same operation at the exact same time. The output from the two is compared as it becomes available. This method requires that the outputs are buffered, and so any miscompare signal is typically delayed. Another method uses tight synchronizing of the two processors—each processor is performing the exact same operation on each and every external bus clock cycle. Both processors must present the exact same result at the same time. Usually in such systems, one processor is designated as the "master" and the other is designated as the "checker". Input signals are presented to both processors at the same time. Output signals of the master are used to drive the rest of the system, but the output signals of the checker processor are only used for comparison purposes. In this method, no buffering is required and the miscompare (error) signal is issued immediately.

In this tightly synchronized configuration, it is necessary to initialize the processors to the same state at reset time. This is referred to as state convergence. Without this, it is very likely that the processors will not follow the exact same path in the execution of a program, causing a difference in their outputs with resultant miscompare signals generated. The problem is that typical processors are not always designed to be put in the exact same state via a hardware reset input signal. Modern microprocessors contain many arrays, such as a branch history table, and latches that have undefined initial states because their initial state doesn't matter in normal usage in a non-cross checked design. This situation is sometimes solved by running some piece of initialization software simultaneously on both processors. The problem with this partial solution is that many modern processors have hardware facilities that can not be directly initialized via software. Depending on the facilities of the processors involved, there may not be an algorithm that would allow two processors to be initialized to the same state in a single reset.

A typical solution for initialization failures, in general, is to try a reset a second time, with the determination and the actual reset initiation being done externally. In the case of two complex processors, many resets may be required to get state convergence, perhaps hundreds. This can be quite time consuming because of the requirement for external determination and initiation, and the many resets could be detrimental to other elements of the apparatus and possibly end users.

An example processor facility that is typically in a random state (upon power up) is a branch history table (BHT). It consists of an array of stored branch points (instruction addresses) and for each branch there is a history of how the branch was taken, or not, previously in the program, as an aid in predicting future branch direction. It is usually not directly modifiable from software. It is only initialized by software instructions taking or not taking conditional branches. Trying to initialize a BHT by doing conditional branches almost always results in the processors, or processor cores, getting out of synchronization due to the different initial states in the BHT arrays.

An obvious answer to this problem is to change the design of the processor so that it can be completely initialized more easily. Unfortunately, the processor design is usually "as is" and is not subject to design changes. The present invention addresses these typical shortcomings in processor error checking design.

SUMMARY OF THE INVENTION

A better solution is to build into a computer system design the ability to detect unsynchronized processors as early as possible, and to reset the processors as required multiple times in rapid succession during processor initialization, typically without requiring a user's knowledge that these resets are taking place. On each reset of the initialization program code, the checker processor stays in synchronization with the master processor for a longer time, enabling it to execute a larger portion of the initialization program together with the master processor. The reason for this, as explained briefly above, is that the branch history table in each processor is initially in a random state and so are not even remotely synchronized. Therefore, as an example, each processor would pre-fetch different instructions and/or data because the branch history table is used for this type of predictive purpose.

Thus, each processor would decide to take a different branch and these different fetches would be detected as a miscompare or error, and an error signal generated. Since both processors have come this far in executing the identical instruction stream, up until the miscompare is detected, their branch history tables are updated in a similar fashion because of their common branch history, and so they resemble each other more so than before executing the identical instruction stream. Thus, the partial execution of the identical code advances the processors toward a state convergence because their branch history tables are more similar than they were before they executed the identical program.

By directing both processors to restart executing the identical instruction stream, the processors will execute a larger portion of the same program before undergoing another miscompare because their branch history tables resemble each other more closely by having been adjusted toward a state convergence via the previous partial execution of the program. Each restart will adjust more and more of each branch history table because more and more of the program will have been executed with each restart and so more identical program history will have been gained with each pass. The increase in common program history between the processors results in more of their branch history tables being updated with identical histories. Eventually both processors will be able to execute the entire initialization code without miscompare errors. In this manner the multiple processors converge to a common state quickly, and the multiple resets can be made transparently to other elements of the system.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
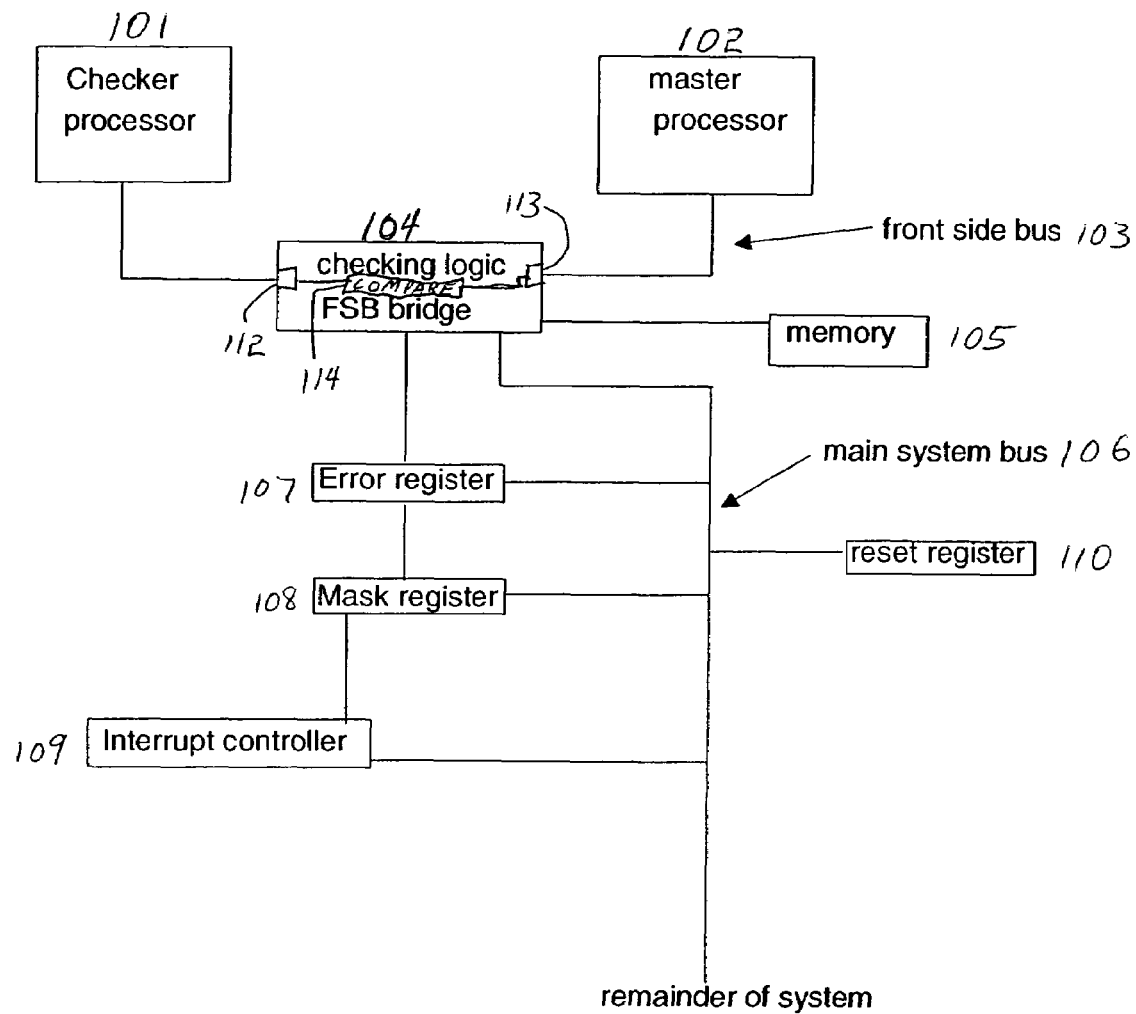
FIG. 1 shows a tightly coupled, cross checked computer system with two processors, checking logic, and some associated registers accessible to the processors.

FIG. 1 shows an implementation of the necessary elements of the invention, intended as an example. There are two identical processors, checker processor 101 and master processor 102, with associated logic, checking logic 104. The two processors may be discrete microprocessors, discrete microcontrollers, or processor cores implemented as part of a large integrated circuit. In some cases, the entire diagram could be implemented on one integrated circuit chip, such as a system-on-a-chip. Each processor has a front side bus (FSB) 103, by which it interacts with the logic. A typical system would usually have an FSB 103 to system bus 106 bridge combined with a memory controller. The checking logic is shown as part of the FSB bridge, but there are a variety of suitable ways to implement the checking logic. A simple form of checking logic is shown as comprising two registers 112 and 113, one for each of the processors to hold their output data, and a compare circuit 114 for comparing the output data at each system clock signal. The compare logic could be any other type of circuit now known or hereafter developed that provides a similar function.

The error register 107 is a hardware facility by which software executing on the processors may obtain the status of the cross checking logic—whether or not a cross check (e.g., miscompare, error) has occurred. This may be as simple as a single bit in the register but more often is implemented as several bits indicating more detail about the error. The master processor 102 is able to clear this register by writing to it.

The interrupt mask register 108 controls the routing of the cross check errors to the interrupt controller 109. When the system is first reset, cross check errors are prevented from reaching the interrupt controller so that more comprehensive system interrupt handling is not triggered. One aspect of the present invention derives its benefit from restarting system initialization in the background without requiring manual or external or user input, thus, a system wide interrupt is not required. Once the system initialization has completed, and the error register has no errors on, the system software alters (updates) the mask register so that future cross check errors will result in a system error interrupt. The interrupt controller itself typically receives inputs from multiple sources, and the cross check error input(s) are routed to a "machine check", "critical", or some such high priority error interrupt class.

The reset register 110 must be writable by the master processor. Its function is to reset the two processors without necessarily resetting other elements of the system. For a small system a complete reset may be acceptable, but for most systems utilizing a cross checked design a subsystem reset is preferable, e.g., resetting the processors. The memory 105 may be any number of memory types—static random access memory (SRAM), dynamic (DRAM), flash memory, or some combination of types. It typically stores the initialization software or program.

The remainder of the system is highly dependent on the application. It may consist of disk drive controllers, IO adapters, medical sensor electronics, etc.

Figure 2:
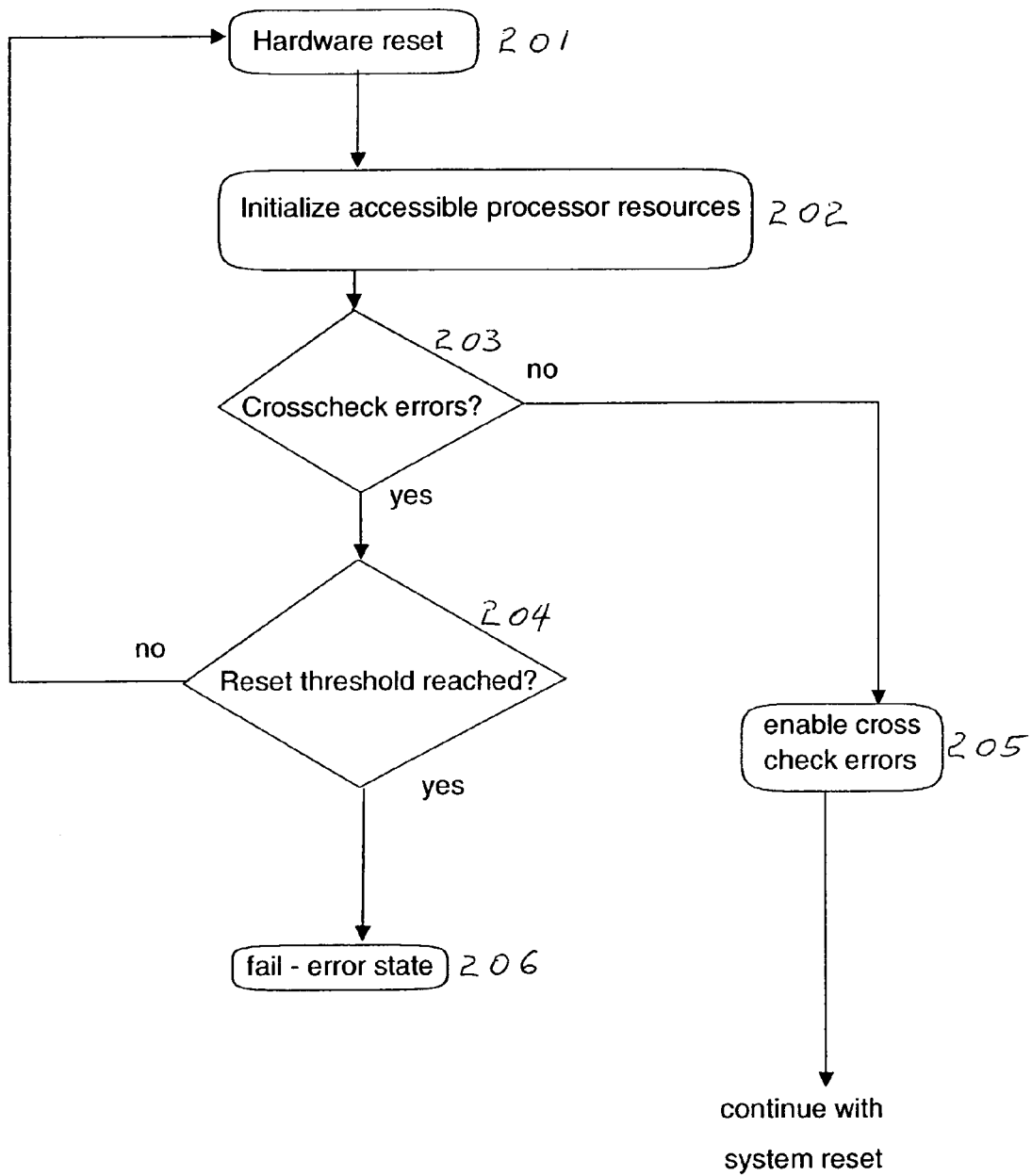
FIG. 2. Is a simplified flowchart of how initialization firmware would make use of the facilities shown in FIG. 1.

FIG. 2 is a high level flowchart of initialization software that would make use of the facilities shown in FIG. 1. The sequence would start with a hardware reset 201, which typically consists with the assertion of a reset signal to all elements of the system while the system clock runs for some specified number of cycles. The mask register is set to disable cross check errors from being reported to the interrupt controller. The cross check error register is set to zero, indicating no errors. When the reset signal is deasserted, both processors begin fetching and executing the initialization program contained in memory 202. The mask register continues to prevent cross check errors from being reported to the interrupt controller, but the cross check error register is functional and usable by the initialization software.

The initialization of the processors themselves would typically be first. The nature of the initialization software, and the exact sequence used is dependent on the processors. A desirable implementation would be to fetch the initialization software into the level 1 instruction cache of the processors, if such a cache is provided on the processors, prior to executing it. This would allow the checker processor to continue to run the initialization program even if it goes out of sync with the master processor (because it would not need to send data requests over the FSB and possibly trigger a miscompare), thus, reducing the number of processor resets required because more of its branch history table would be updated to reflect the initialization program history.

When the processor initialization is complete, the initialization software reads the error register to determine if a cross check has occurred 203, indicating that the processors are out of sync. If so, the initialization software checks a counter to determine if the number of processor reset attempts has exceeded some threshold 204. If it has not, it increments the counter and writes to the reset register to reset both processors. The counter could be implemented as part of the reset register, a separate register, or a location in memory.

The value used for the threshold is not critical, but should take into account the expected opportunities for the checker processor to diverge from the master processor during the execution of the initialization software. Its value should be significantly higher than the maximum value expected for properly functioning processors. If the threshold has been reached, the action taken is dependent on the application, but it generally involves putting the system in an inoperative, yet safe state (e.g. a failure state) 206, until it can be repaired.

Unlike the initial system wide reset, the subsequent reset created by the initialization software does not necessarily have to impact all areas of the system, but it must reset both processors. It is the reset of the processors that advances the processors toward a convergence state or, in fact, causes a complete state convergence of the processors, and causes them to restart executing the initialization software together. Using an interrupt to try to perform this would be unlikely to work, because the checker processor may have taken a higher priority error interrupt, or the error state it is in may mask off other error interrupts. The reset could reset most of the system, with the exception of the counter of the number of reset attempts. In most systems, it is usually faster and less disruptive to limit the scope of this secondary reset. The reset counter would typically be reset as part of a reset of a larger scope—a complete system reset.

On each subsequent restart to execute the initialization software, the processors are able to execute a larger portion of the initialization software, until finally the cross check error register shows no errors when it is read. In most cases, this is enough to assure that both processors have executed the initialization software and are synchronized. Because only the processors are being initialized in this loop, in can be completed quickly, leaving enough time for initializing other parts of the system, and without triggering a system wide reset or involving the interrupt controller. At some point after initialization and after checking for cross check errors, the interrupt mask register is updated to allow its usual reporting of cross check errors to the interrupt controller 205.

Note that this loop is limited to the initialization of the processors. Other elements of the system are only given the one initial global reset. This serves to speed up the reset (restarting) of the processors, to quicken their advancement toward state convergence, and to make this reset repetition loop as invisible as possible to the outside world.

We claim:

1. Method of verifying master processor operation comprising:

providing a checker processor;

executing a same instruction stream by the checker processor as the master processor, the instruction stream includes instructions for initializing the master processor and checking processor, the instructions are expected to generate at least one miscompare when executed during an initialization sequence at start up time before the master processor and checking processor have been initialized for the first time, wherein an initial execution of the instruction stream comprises execution of the series of instructions for generating the at least one miscompare;

comparing outputs of said master processor and said checker processor and outputting an error signal if at least one miscompare occurs; and detecting the error signal and determining whether the master processor is to issue a restart signal for restarting execution of the same instruction stream, wherein the restarting comprises a subsequent re-execution of the series of instructions without generating the at least one miscompare.

2. Method according to claim 1, further comprising:

providing a reset register and storing therein a total number of restart signals issued by the master processor; and determining not to issue a restart signal if the total number of restart signals stored in the reset register exceeds a predetermined number.

3. Method according to claim 2, wherein the determining step further comprises: the master processor issuing a system failure state signal.

* * * * *